(12) United States Patent
Samodell et al.

(10) Patent No.: US 6,388,232 B1
(45) Date of Patent: May 14, 2002

(54) STARTING AND WELDING DEVICE FOR DC TIG WELDER AND METHOD OF OPERATING SAME (75) Inventors: Ralph M. Samodell, Willoughby Hills; Trang D. Nguyen, Mentor, both of OH (US)

(73) Assignee: Lincoln Global, Inc., Monterey Park, CA (US)

( * ) Notice: Subject to any disclaimer, the term of this patent is extended or adjusted under 35 U.S.C. 154(b) by 40 days.

(21) Appl. No.: 09/722,186

(22) Filed: Nov. 27, 2000

(51) Int. Cl.$^7$ .................................................. B23K 9/10
(52) U.S. Cl. ............................ 219/130.33; 219/130.4; 219/137 PS
(58) Field of Search ........................ 219/130.33, 137 PS, 219/130.21, 130.31, 130.32, 130.4

(56) References Cited

U.S. PATENT DOCUMENTS

| | | | |
|---|---|---|---|
| 3,530,359 A | * | 9/1970 | Grist .................... 219/130.32 |
| 3,774,007 A | * | 11/1973 | Chiasson et al. ...... 219/130.32 |
| 3,961,154 A | * | 6/1976 | Ericsson ................ 219/130.33 |
| 4,950,864 A | | 8/1990 | Campiotti et al. |
| 5,148,001 A | | 9/1992 | Stava |
| 5,218,182 A | | 6/1993 | Vogel et al. |
| 5,645,741 A | | 7/1997 | Terayama et al. |
| 5,773,792 A | * | 6/1998 | Hagiwara et al. ........ 219/130.4 |
| 6,034,350 A | | 3/2000 | Heraly et al. |
| 6,075,224 A | | 6/2000 | De Coster |

* cited by examiner

Primary Examiner—Clifford C. Shaw
(74) Attorney, Agent, or Firm—Vickers Daniels & Young (57) ABSTRACT

A DC TIG welder operable at a set low current level under about 5 amperes in a welding circuit including an electrode separated from a workpiece by a gap, the welder having an output welding current adjustable above the low current and driven by a constant current power supply with a first rectifier having an output current controlled by the firing phase of SCRs in an SCR network, a second rectifier settable at the low current and a sensor for sensing arc voltage. The welder further comprises: a circuit to deactivate the SCRs when the output welding current is equal to or less than the set low current and an arc starting device to cause the first rectifier to output a high pulse by operation of the SCRs of the network.

51 Claims, 6 Drawing Sheets

STARTING AND WELDING DEVICE FOR DC TIG WELDER AND METHOD OF OPERATING SAME

The present invention relates to the art of electric arc welding and particularly a starting device for use in a DC TIG welder operated by an SCR input and capable of sustaining a welding arc at a low current.

INCORPORATION BY REFERENCE

In TIG welding a tungsten electrode is spaced from a workpiece to define a gap across which an arc is created for melting a filler wire moved into the arc. This type of welding presents problems relating to the starting of the arc at the start of the TIG welding process. Several procedures are known to start the arc when the TIG welder is operated at over about 5 amperes. Starting procedures and background technology regarding arc starting is discussed in De Coster U.S. Pat. No. 6,075,224. This patent illustrates an arc starter circuit using high frequency. As background information, this patent is incorporated by reference. The present invention relates to a high current DC TIG welder which is operable at a low weld current, such as a current in the general range of 2–5 amperes, but with capability for lower minimum output. The architecture of the TIG welder employed in practicing the present invention involves a power supply with a background stage used in conjunction with a standard phase controlled constant current stage. The use of an auxiliary or background power supply is shown and discussed in De Coster. Such an architecture for a welder is also disclosed and described in Campiotti U.S. Pat. No. 4,950,864, Vogel U.S. Pat. No. 5,218,182, Terayama U.S. Pat. No. 5,645,741 and Heraly U.S. Pat. No. 6,034,350. These patents are incorporated by reference herein to describe the operation of a background, rectified power supply used in combination with a standard phase controlled power supply for TIG welding. The background power supply maintains a minimum current and the main power supply provides weld current above a minimum level for the actual welding process. The present invention utilizes a background current stage and details of such operation are not necessary in view of the well known technology set forth in these several patents.

BACKGROUND OF INVENTION

DC TIG welders powered by a single phase SCR rectified welding current have an adjustable welding current determined by the phase firing angle of the SCRs in the network of the output rectifier. For industrial use they have adjustable welding DC currents as high as 200–300 amperes. As the desired welding current is reduced to a low level, such as 5–10 amperes, the phase angle is shifted to produce a reduced amount of the current flow. Such low current operation is not conducive to arc stability because the SCRs are on for a short time; therefore, a secondary power supply creating a fixed minimum current is often used in conjunction with the phase controlled rectifier. The low current operation includes a series of small current pulses in combination with a fixed background current. This architecture presents difficulty at low welding currents because the standard procedures for starting the arc is not consistent at low currents. Consequently, in the past the lowest current which could be used in a DC TIG welder of the type capable of operating at 200–300 amperes and driven by a single phase SCR platform was about 5–10 amperes. At this low weld current, high frequency or scratch arc starting, as discussed in De Coster U.S. Pat. No. 6,075,224, was marginally acceptable. If the main power supply stage was operated at a high level for a short time to start the TIG welder, the minimum current operation was still 5 amperes or more because of the short SCR spikes during the welding operation. There is no SCR driven TIG welder which can be successfully started at low currents below 5 amperes and then operated at such level with a stable arc. Such low welding current is the optimum current for certain welding processes, such as welding thin aluminum parts. Low current for DC TIG welding means a welding current less than about 5 amperes, and in the general range of 2–5 amperes. The power supply for a DC TIG welder can be adjusted to a low current by reducing the conduction period of the SCRs; however, there is no dependable procedure for starting the DC TIG welding process at such low currents and then maintaining the arc stability since the low current involves merely short spikes from the SCRs. This is especially true when the welder is designed to operate at current levels of 200–300 amperes when the SCRs are nearly fully conductive.

SUMMARY OF INVENTION

The invention involves a DC TIG welder driven by a single phase SCR platform and having a capacity of up to 100–300 amperes. The welding current of the welder can be set to a low level, substantially less than 5 amperes and in the general range of 2–5 amperes. At such low current, the welder now provides a welding current waveform similar to an inverter based welder. The invention employs a power supply having a phase control rectifier stage and a background rectifier stage. The background rectifier is set at the desired low current to be used for low current welding. The starting device of the welder employs both stages for starting, but maintains the arc using only the low current stage of the power supply. Consequently, the SCRs are not used during minimum current operation. A primary aspect of the invention is a high capacity welder that uses the phase control stage of the power supply only during starting when the welder is set for low current operation. While providing low current from the second rectifier a novel start sequence is implemented by a start device using any software or hardware technique. A high frequency generator passes a high frequency, high voltage signal across the gap between the workpiece and electrode. A start pulse with a controlled peak current in the general range of 50–70 amperes is created by short term operation of the SCR rectifier. By combining the standard high frequency arc starting procedure with the controlled arc starting pulse, the arc is positively created and stabilized. The pulse is tailored to optimize the creation of the arc by having the controller progress to a peak current of 50–70 amperes, then tail off. The duration is generally 30–50 milliseconds. This includes about 2–4 firings by the SCRs of the first rectifier. The high frequency complements the controlled short, high current start pulse to assure ionization of the gap before the pulse is applied across the gap by the first rectifier. After the current pulse has created the arc, high frequency is terminated. The high frequency is discontinued for welding at the fixed low current established by the background stage of the power supply using no SCR currents.

If the desired weld current is adjusted above the set low current of the second rectifier, the main SCR rectifier is initiated and the SCR network is used. The invention has proven satisfactory in TIG welding to a level as low as 1 ampere with a SCR based welder having a high current capability. The welder operated at 2 amperes maintains a well-defined arc created by the high voltage start pulse of the present invention without disrupting SCR spikes associated with low current welding by such high capacity DC welder. Although starting procedures known in the prior art are successful for high welding currents in an SCR based DC TIG welder, such starting procedures are not capable of establishing an arc for low current TIG welding and then sustaining the arc without use of SCR current spikes. The present invention accomplishes the objective of a DC TIG welder of the SCR type that can be operated at a low current without SCR spikes. If the desired weld current is greater than the peak current of the start pulse, the start pulse is not required.

In accordance with the present invention, there is provided a DC TIG welder operated at a low current level, under about 5 amperes in the gap between an electrode and a workpiece. The DC TIG welder has an adjustable output welding current and is driven by a constant current power supply with a first rectifier having an output current controlled by the firing phase of SCRs in an SCR network, a second rectifier settable at a low current below about 5 amperes, and a sensor for sensing the arc voltage. As so far described, the invention is a somewhat standard DC TIG welder, except that the second rectifier of the prior art is not used for welding, but is used to fill in between SCR spikes to stabilize the arc. The arc voltage sensor is used in practicing the present invention. The welder includes a circuit to deactivate the SCRs when the output welding current is equal to or less than the set low current level of the second rectifier stage. The arc is started by first connecting a normal high frequency generator in the welding circuit to pass a high frequency, high voltage current across the gap. Such high frequency generator is used routinely in starting AC and DC TIG welders operated at welding currents substantially above 5 amperes. In accordance with the invention, the arc starting device comprises a circuit for activating this high frequency generator upon starting of the TIG welder and after the arc voltage is sensed to be greater than a given value. This given value in the preferred embodiment is 35 volts DC. As is well known, the arc voltage of a constant current power supply is greater than this given value, there is no arc. The established open circuit voltage of the constant current power supply is being approached. In the invention, a start pulse device, i.e. software, hardware, etc., creates a current pulse simultaneously with a high frequency generator to cause the SCRs of the first rectifier to output a high current pulse having a peak substantially greater than the low current of the low current power supply. The start pulse is obtained by the controller causing a current to rise toward the peak current. A request for a starting pulse results in a command signal to cause operation of the SCRs of the rectifying network in the first stage. The start pulse is tailored to create an arc across the gap and, in practice, has a peak current of 50–70 amperes with a duration of 30–50 milliseconds. The start sequence is initiated when the voltage across the gap is high, indicative of the absence of an arc. The start pulse is created by the high voltage applied across the gap by the power supply after the gap is ionized by the high frequency. Thus, the pulse is created with the high frequency. The pulse during high frequency positively creates an arc. When the welder is operated at minimum current, the phase controlled stage of the power supply is used merely to create the starting pulse. After the sensed arc voltage is decreased below a given value, indicating that a start pulse current is initiated, the high frequency across the gap is terminated. The minimum current welding continues without SCR spikes.

In accordance with an aspect of the invention, deactivation of the high frequency generator has a time delay after an arc voltage across the gap has been decreased upon creation of the arc. The low current or minimum current rectifier stage of the power supply is used exclusively for low current welding at the set current of the second rectifier. This rectifier is adjusted to a weld level in the range of 2–5 amperes.

If and when the welding current demand is for a weld level exceeding the current of the low current second rectifier stage, the phase controlled rectifier stage is initiated to provide the additional current. However, the present invention is directed to a DC TIG welder designed for industrial use and with a rating over 100 amperes that can be operated at a minimum current in the general range of 2–5 amperes without the need for phase controlled current pulses. To accomplish this objective, the non-phase controlled rectified stage of the power supply is adjustable by a variable resistor to obtain the desired open circuit voltage and the desired low current output without the need for current from the SCRs in the power supply. The variable resistor in the low current stage of the power supply sets the output level of the low current stage. In practice, this low current is 2–5 amperes; however, it has been operated at about 1 ampere.

In accordance with another aspect of the present invention, the phase controlled power supply is used when the required welding current is adjusted above the low current level of the fixed stage of the power supply. The term "fixed" indicates that it has been adjusted to a low current weld level sustainable without SCR spikes.

In accordance with another aspect of the present invention, there is provided a method of creating an arc in the gap between the electrode and workpiece of a DC TIG welder operated at a low current level, under about 5 amperes. The welder provides a current with an adjustable level in a series circuit including a gap. The welder is driven by a constant current power supply with a first rectifier having an adjustable output current controlled by the firing phase of an SCR network and a second rectifier with a fixed, but settable low current. To start the TIG welder, there is a device for sensing the arc voltage. This inventive method involves activating a high frequency starting generator upon starting of the welder, but after the arc voltage is greater than a given value. Then the first adjustable rectifier outputs a current pulse with a high-peak current. This pulse involves operation of the SCRs. Then, the high frequency voltage is deactivated.

The primary object of the present invention is the provision of a DC TIG welder with an SCR based DC power source for providing high current, wherein the welder can be operated at a low current without use of SCR spikes. The welder has an arc starting system which is positive in operation and novel in concept.

Another object of the present invention is the provision of a high capacity, SCR based DC TIG welder operable below about 5 amperes, which welder does not cause popping or melting of the tungsten electrode.

A further object of the present invention is the provision of an SCR based, DC TIG welder having a starting device so the welder can be operated at low currents without the need for current from an SCR rectifier stage and can be reliably started and sustained.

Another object of the present invention is the provision of a high capacity, SCR based DC TIG welder operable at a low current where the low current is not established by a phase back of the SCRs.

Yet another object of the present invention is the provision of an SCR based DC TIG welder, as defined above, which TIG welder has a positive arc starting capability by using a tailored starting pulse with a high current peak in combination with a high frequency ionization voltage.

Still another object of the present invention is the provision of a DC TIG welder, as defined above, which TIG welder uses a voltage sensor to indicate the existence of an arc and/or current flow to control the starting mode at currents even less than 2 amperes.

These and other objects and advantages will become apparent from the following description taken together with the accompanying drawings.

PREFERRED EMBODIMENT

Figure 1:
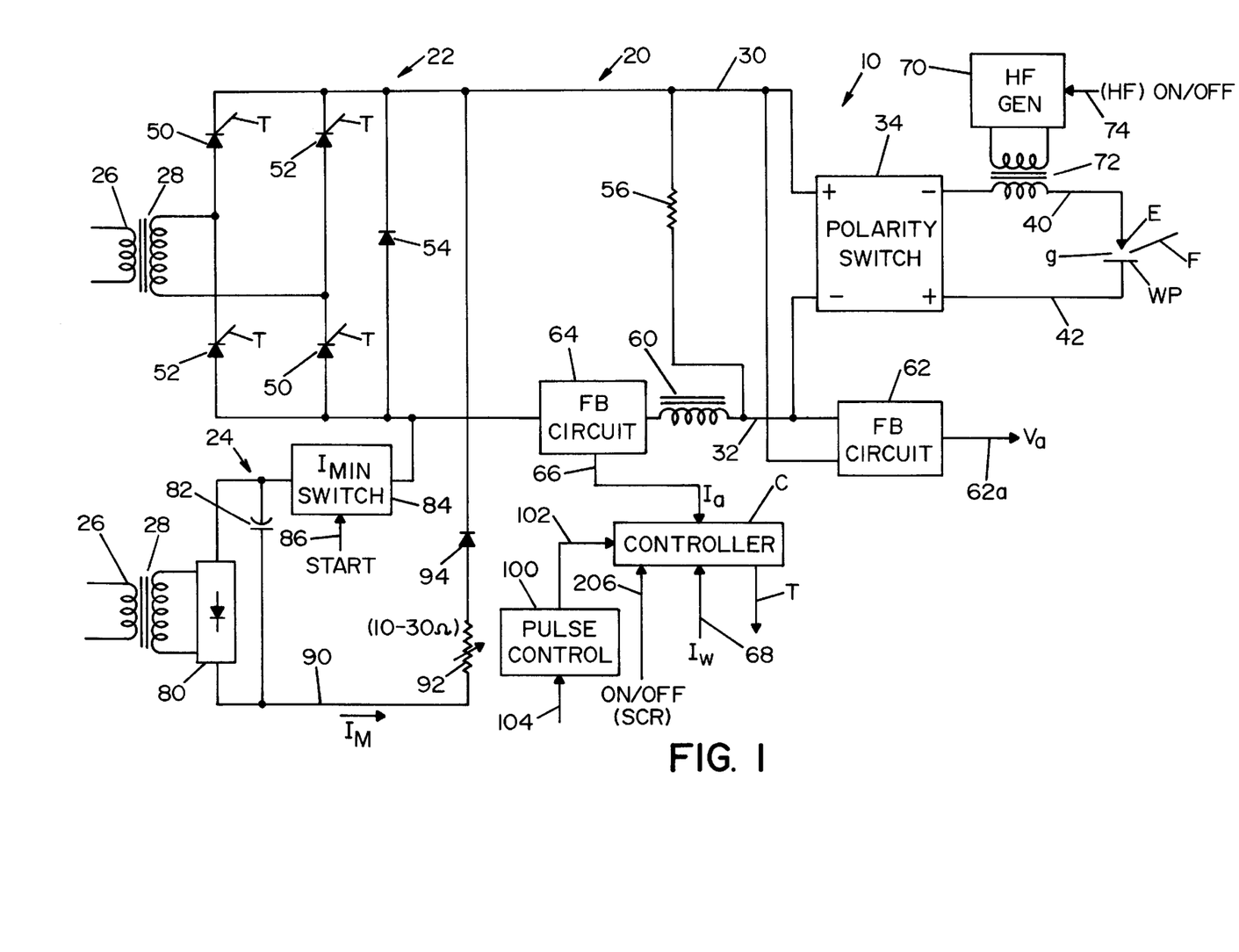
FIG. 1 is a wiring diagram of a DC TIG welder constructed in accordance with the invention.

Referring now to the drawings, wherein the showings are for the purpose of illustrating the preferred embodiment of the invention only and not for the purpose of limiting same, FIG. 1 shows DC TIG welder 10 constructed in accordance with the preferred embodiment of the present invention. The welder is standard and operates at high welding currents. Welder 10 passes current across gap g between tungsten electrode E and workpiece WP. After an arc has been established in gap g, filler wire F (if used) is moved into the arc where it is melted and deposited on the workpiece for performing the welding operation. In accordance with the invention, power supply 20 has two stages driven by rectifiers. Stage 22 is an adjustable stage for high current welding. Stage 24 is a fixed stage with a settable low current output for low current welding. Both of these stages are driven by single phase input 26 through a step-down transformer 28 to create current in output leads 30, 32. These leads define a series welding circuit for passing current across gap g. In accordance with standard technology, a polarity switch 34 selects the polarity on output leads 40, 42 to shift between electrode positive and electrode negative TIG welding. In the preferred embodiment the electrode is negative. Adjustable phase control stage 22 is quite standard in the DC TIG welding art. Single phase input 26 drives a controllable rectifier, including an SCR network with two sets of SCRs 50, 52, each having a phase firing angle controlled in unison by logic on gates T. Gate pulses on lines T are created in accordance with a desired phase selected by standard controller C. Trigger command pulses are gates signals in lines T. In accordance with standard practice, leads 30, 32 are connected by freewheeling diode 54 and resistor 56. This resistor has a value necessary to hold SCRs 50, 52 in a conductive state until reverse voltage is applied across the SCRs. For the purpose of smoothing the DC current in leads 30, 32, and thus, in leads 40, 42, there is provided a standard inductor 60. The arc voltage is detected by sensor 62 connected across leads 30, 32. In a like manner, arc current is determined by a shunt 64 so the voltage level on input 66 of controller C is the real time welding current across gap g. Consequently, controller C monitors the real-time arc current $I_a$ by reading the voltage level on input 66. This voltage level is compared to set weld level $I_w$ represented by the voltage on input line 68. Current $I_w$ is the operator selected weld current for TIG welder 10. During high current operation, which may be as high as 300 amperes, controller C compares the voltage on lines 66, 68 to create an error signal, the value of which determines the sequencing of gate pulses in triggers lines T. To start the arc for high current operation of welder 10, it is standard practice to use a high voltage, high frequency generator 70 connected by transformer 72 to the output welding circuit, as shown in De Coster U.S. Pat. No. 6,075,224. High frequency across gap g ionizes the gas in the gap to cause slight current flow. The open circuit voltage of stage 22 is across the gap. This starts the arc when controller C is set to a high desired current $I_w$. Generator 70 is activated in accordance with the logic on input line 74. As so far described, stage 22 is a standard TIG welder driven by a phase control power supply. The desired current $I_w$ is adjusted by an operator (user) through manipulation of a rheostat or device 260 of FIG. 2A to provide a signal voltage on line 68. This signal is proportional to the welding current desired by the user. Such signal voltage is compared with the voltage signal on line 66 to control the phase angles of the four paired SCRs 50, 52 in stage 22. At the start of the weld cycle, high frequency generator 70 is activated by a logic 1 on line 74. Such SCR based DC TIG welder is designed for currents as high as 300 amperes, but can not be used for TIG welding below about 5 amperes. At such low current each SCR must be phased back to produce a short spike. The arc is not stable in this low current condition.

In accordance with the invention, welder 10 is constructed to operate at a low current using low current power supply 24 and an electric arc starting device or sequence that assures a stabilized arc across gap g during such low current operation. In this mode, welder 10 welds at low current without SCR spikes associated with operation of phase control stage 22. To accomplish the advantage of low current operation without disruptive current spikes, settable stage 24 of power supply 20 includes a fixed current rectifier 80 for converting single-phase input 26 to a DC voltage across filter capacitor 82. Stage 24 is a low current power supply. Switch 84 activates stage 24 when a logic one is on input line 86. A logic 1 connects fixed low current stage 24 across stage 22. The output current of stage 24 is set by the value of adjustable resistor 92. In practice, this resistor is adjusted to provide a current as low as 1–2 amperes, but primarily a current between 2–5 amperes. This low current could be as high as 8–10 amperes. To finalize the architecture of stage 24, there is provided a blocking diode 94.

Figure 1A:
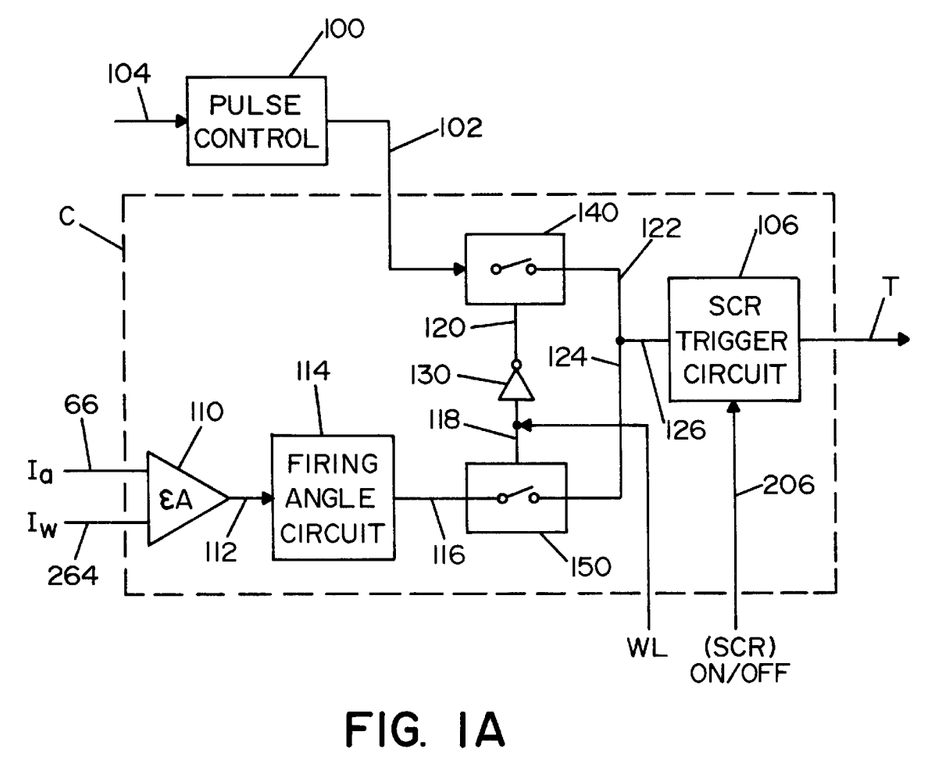
FIG. 1A is a logic diagram, flow chart and/or partial block diagram showing a portion of the controller used in the TIG welder shown in FIG. 1, which portion is implemented in software and/or hard wiring.
Figure 3:
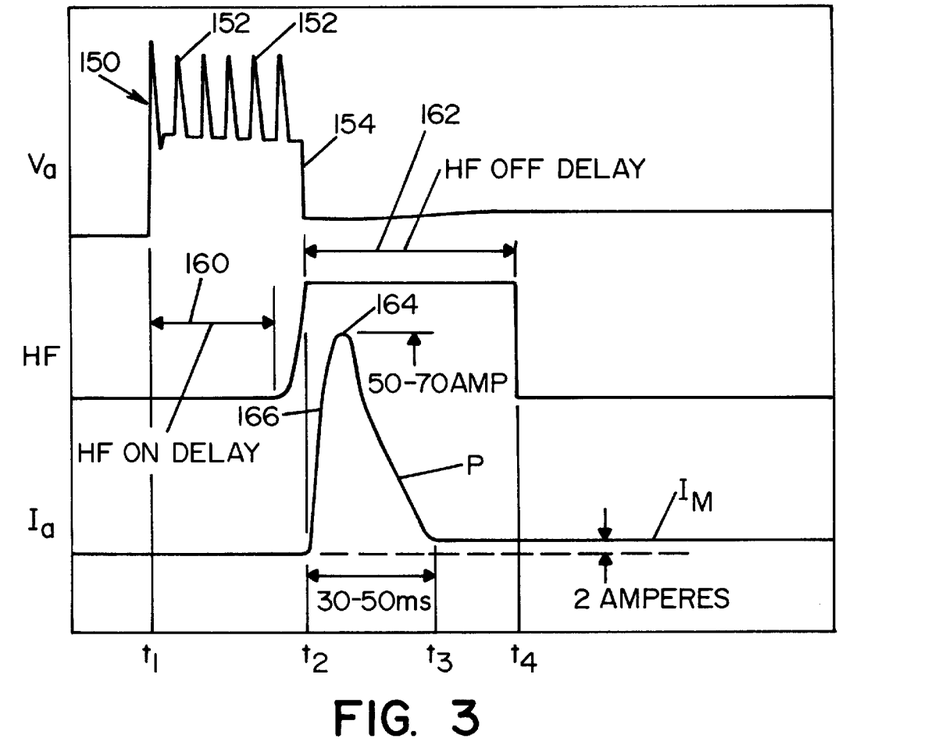
FIG. 3 is a voltage and current graph of the arc starting procedure provided by the present invention.

In accordance with the invention, stage 24 is connected across stage 22 when weld start 86 is turned on. In this embodiment, the low current value is set by resistor 92. This operation uses a power supply which is not adjustable in operation, but produces a DC voltage of over 50 volts across lines 30, 32 without using the SCRs of stage 22. To start the arc, a current pulse P, as shown in FIG. 3, is created across gap g by controller C. The controller is biased to obtain a peak current, such as 50–70 amperes so SCRs 50, 52 in stage 22 are operated for a few cycles to obtain this peak current. The shape of pulse P is determined by the setting of the peak current and the duration of the pulse. Pulse control 100 contains these parameters as represented by the signal on output 102 at the beginning of the start pulse. The pulse is initiated by a signal on input 104 to bias controller C as shown in FIG. 1A. Stage 22 is driven by either the signal in line 122 or in line 124. Line 124 regulates stage 22 toward the operator desired current $I_w$. Line 122 regulates stage 22 toward pulse current P. The selection between desired current $I_w$ and pulse current P is made through electronic switches 140 and 150. A logic 1 in control line WL applies a high level to line 118 and close switch 150; inverter 130 inverts to logic 0 in line 120 and open switch 140. Vice versa, a logic 0 in control line WL open switch 150 and close switch 140. When switch 140 is closed, the signal in line 102 from pulse control 100 feeds to line 126 and control stage 22 toward pulse current P. Error amplifier 110 is used when welder 10 is not in the low current mode. Thus, the operator desired current $I_w$ is greater than the current $I_M$ of stage 24. In this current operation, an error signal in line 112 is indicative of the difference between the desired current $I_w$ in line 264 and the actual current $I_a$ in line 66. The voltage signal in line 112 controls firing angle circuit 114. When switch 150 is closed, the signal in line 116 from firing angle circuit 114 feeds to line 126 and control stage 22 toward the operator desired current. The logic of FIG. 1A can be implemented by standard technology such as analog, programming or dedicated microprocessor routine.

In low current operation, power supply 24 directs a fixed low current across the gap g. However, at the start of the welding operation, SCR trigger circuit 106 creates pulse P by circuit, or network, 100, which is a software program or analog circuit in controller C. Thereafter, the SCRs are inhibited as illustrated by logic on line 206. To start the arc of welder 10 when the welder is being operated by only fixed stage 24, pulse P shown in FIG. 3 is created by the pulse control network, program or circuit 100. This pulse is critical to good arc starting that allows low current operation without SCR spikes. Essentially, this is the primary aspect of the present invention. A tailored pulse P having a set peak is created across gap g to start the arc. Welder 10 is thereafter operated at a low current as set by resistor 92. There is no SCR current from stage 22 to make the arc unstable. Current $I_M$ can be adjusted between 1–5 amperes by resistor 92. To start the arc at such low current, the present invention has been developed. Its primary operation parameters are set forth in FIGS. 3 and 4.

Referring to FIG. 3, the voltage, current, and high frequency curves obtained when using the present invention are illustrated schematically. These curves occur when DC TIG welder 10 is operated at the low current level $I_M$ to which stage 24 is set. This fixed low current level is adjusted by resistor 92. In accordance with the invention, TIG welder 10 is started at time $t_1$ by closing START switch 200. At the start time (after gas preflow), controller C activates stage 22 and 24 of power supply 20. The open circuit voltage is shown as voltage curve 150 that includes a series of SCR pulses 152. As soon as the power supply is started at time $t_1$, arc voltage 150 increases toward open circuit voltage for stage 22. This increase in voltage initiates a high frequency turn-on delay step to give a time delay 160 between time $t_1$ and just short of time $t_2$. This turn-on time delay is quite short (10–50 ms) and is for output stabilization. After the turn-on time delay 160, the high frequency generator ionizes the gas in gap g. Since a high voltage is applied across the gap, the arc current starts to flow. The initial demand for current from the power supply is to obtain the peak current. This creates pulse P initiating at $t_2$ by pulse control 100, as previously described. The current advances to the biased peak current of pulse P. Current has started to flow because of the high frequency ionization and the high voltage across the gap. Current flow causes the open circuit voltage to drop as indicated by trailing edge 154. The voltage drop at edge 154 initiates a high frequency turn-off delay time (50–100 ms) 162, to allow the welding arc to stabilize, so that generator 70 discontinues operation at time $t_4$. During delay 162, pulse P has been created and terminated at time $t_3$. The duration of pulse P is in the general range of 30–50 milliseconds and has a maximum peak current 164, which is in the general range of 50–70 amperes. Pulse P has front edge 166 and controller C is controlled by routine, or start control, 100 raising the current from stage 22 toward the peak of pulse P. Controller C is operated by pulse control 100 whereby it is biased toward a set peak current, i.e. 50–70 amperes. After the peak current has been reached, pulse control 100 allows the weld current to decay. As shown in FIG. 3 the decay is to the set low current $I_M$ to form the trailing edge of pulse P, shown as 2 amperes. As can be seen, when the arc voltage reaches a preselected value at time $t_1$, there is an on-delay establishing when the high frequency generator is activated. Then, current starts to flow causing arc voltage $V_a$ to decline. The setting of pulse control 100 generates pulse P by biasing controller C to the peak current 164. The current increases along edge 166. The open circuit voltage decreases at edge 154. Pulse P has thus started the arc by time $t_2$. The high frequency is deactivated by time $t_4$. This all occurs quite rapidly and is illustrated as occurring generally between times $t_2$ and $t_4$.

Figure 4:
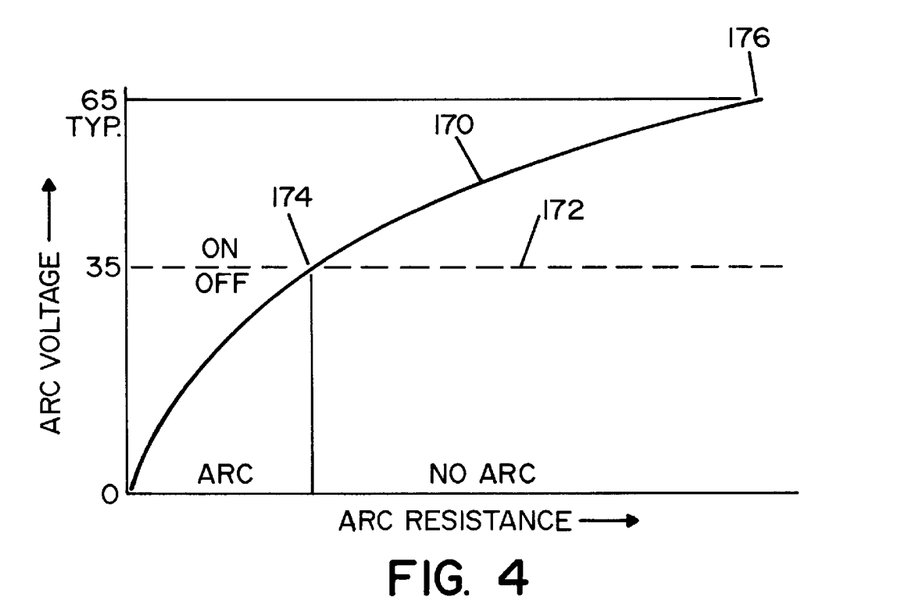
FIG. 4 is a voltage current operating curve for a constant current power supply having an open circuit voltage of 55 volts DC and illustrating the voltage threshold feature of the invention.

It is well known that the voltage of a constant current power supply can be used to detect the arc in a welder. FIG. 4 shows the operating voltage and current line 170 of welder 10. Line 170 illustrates the threshold voltage used to obtain the activation signal at time $t_1$ and the deactivation signal at time $t_2$. In accordance with the preferred embodiment, the threshold voltage is set at 35 volts DC and the typical open circuit voltage for welder 10 is 65 volts DC. The 35 volt DC line 172 intersects operating line 170 at point 174 substantially below open circuit voltage 176. When arc voltage $V_a$ is greater than line 172, there is no welding procedure arc and the start sequence $t_1$–$t_4$ set forth in FIG. 3 is initiated. When the start pulse P causes the voltage decrease at trailing edge 154 in FIG. 3, arc voltage $V_a$ is sensed to be as less than 35 volts DC. In accordance with the invention, the high frequency off delay ($t_2$–$t_4$) is initiated. When arc voltage $V_a$ indicates an open circuit at the START step or switch 200, the START sequence is initiated. The START sequence ends after high frequency off delay, initiated upon a decrease in the arc voltage indicating an arc. A variety of control techniques can be employed for practicing the invention as set forth in FIGS. 3 and 4.

Figure 2:
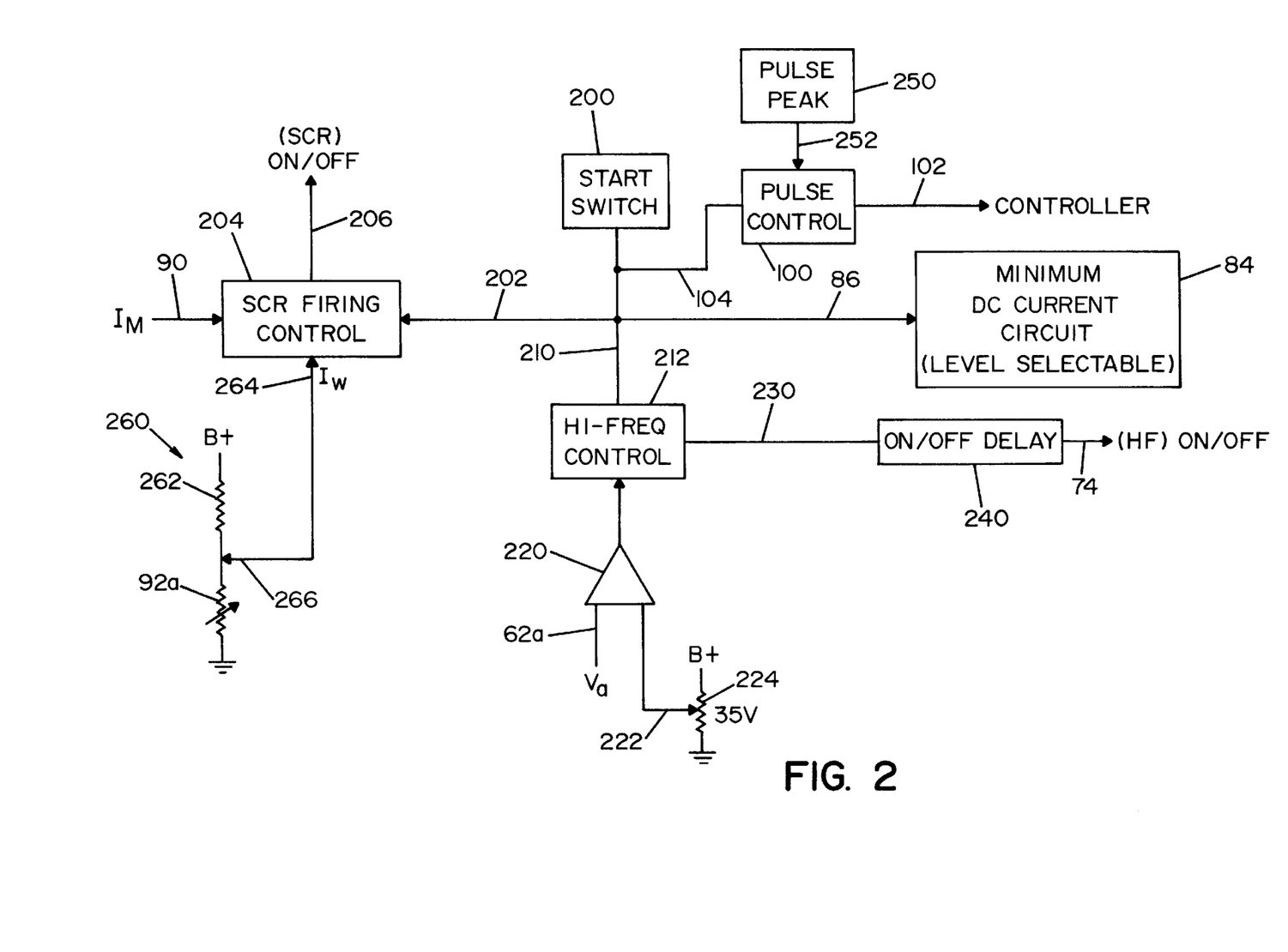
FIG. 2 is a combined block diagram and flow chart of the system used in practicing the preferred embodiment of the present invention.
Figure 2A:
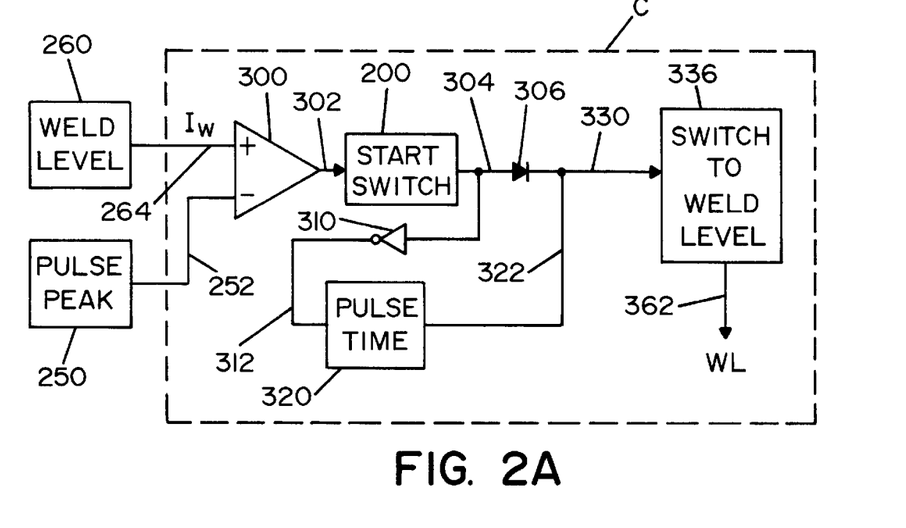
FIG. 2A is a combined block diagram and flow chart illustrating a feature of the preferred embodiment of the present invention.
Figure 2B:
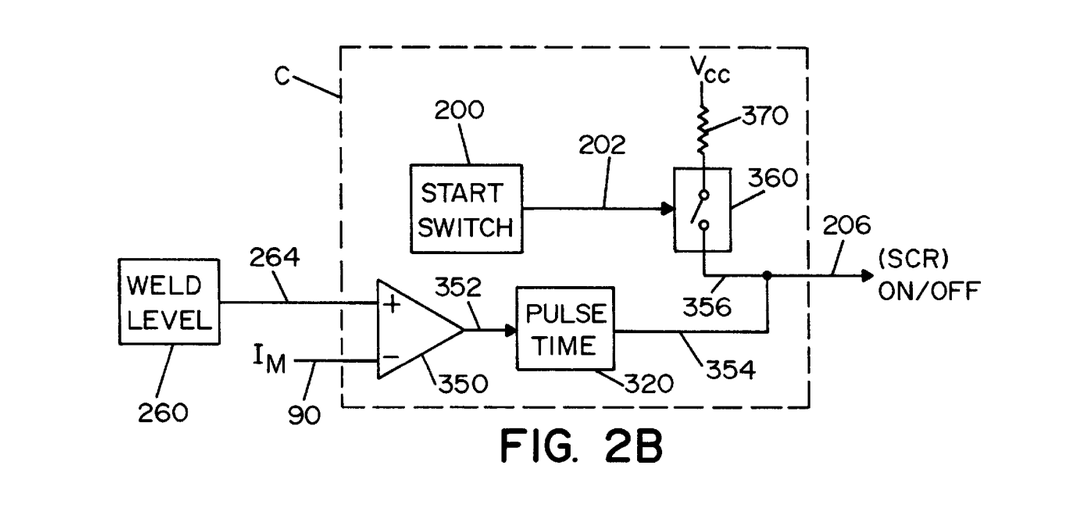
FIG. 2B is a combined block diagram and flow chart illustrating another feature of the present invention.

A preferred implementation of the present invention is illustrated as steps, sequences and/or a flow chart in FIG. 2, as supplemented by the series of steps, logic diagrams and/or flow charts that illustrate features now used for a welder practicing the invention in FIGS. 2A, 2B. In these figures, the operation of the control function for the invention is illustrated in combined hard-wired, sequencing steps and/or flow chart format. The functions of the preferred embodiment of the present invention may also be performed by computer programs and Boolean logic and/or a combination of such logic, programs, and hard wiring. The particular techniques to implement the invention do not define or limit the invention. To weld, a start switch or step 200 provides a START signal at time $t_1$ shown in FIG. 3. This provides a signal in line 86 to initiate the low current power supply stage 24. At the same time, a START signal in line 202 is directed to a SCR firing control 204 incorporated as a part of controller C of FIG. 1. Firing control routine or step 204 determines if the SCRs are prevented from operation by the logic created on line 206 directed to trigger circuit 106. A logic 0 on line 206 inhibits operation of the SCRs when stage 24 is used in low current welding at current $I_M$ set by resistor 92. A logic 1 in line 206 enables operation of the SCRs in stage 22. START switch or step 200 also provides a signal in line 104 to initiate pulse control 100. A signal in line 102 creates current pulse P by setting the pulse peak 250 as the current toward which controller C will be driving stage 22. START switch or step 200 creates an enable signal in line 210 for enabling control 212 to operate high frequency generator 70. Comparator 220 compares a signal representing arc voltage $V_a$ on line 62a with a threshold voltage signal on line 222. This is line 172 in FIG. 4. Rheostat 224 sets the threshold voltage, in the preferred embodiment of the present invention, at 35 volts DC for a power supply having a typical open circuit voltage of 65 volts DC. When arc voltage $V_a$ on line 62a exceeds 35 volts, a logic 1 is created in line 230 by control step 212. The logic on line 230 activates ON/OFF DELAY 240 to initiate the high frequency on delay 160 at time $t_1$ and turn on the high frequency generator 70 at time $t_2$ to cause current $I_a$ to be raised by controller C along edge 166 toward the pulse peak set by pulse control 100.

A logic 1 in line 230 is created at time $t_1$ to also initiate the ON/OFF DELAY 240 which has an initial stage corresponding to turn-on time delay 160 and then a turn-off time delay corresponding to the time represented by line 162 in FIG. 3. ON/OFF DELAY 240 controls the logic on line 74. A logic 1 on line 74 after comparator 220 detects a voltage exceeding 35 volts DC. Time 160 is the on-delay time before a logic 1 appears in line 74. Generator 70 is thereby turned on. A logic zero appears in line 74 during off delay time 162 after comparator 220 senses an arc voltage of less than the preselected value, in practice, 35 volts DC. This is caused by current flow represented by edge 166. Thus, a START signal when a switch or step 200 is manually selected initiates stage 24, and activates pulse control 100 to controller C on line 102. The START signal also enables high frequency control 212 awaiting a high voltage $V_a$ on line 62a. After the pulse, the logic on line 74 shifts to zero to terminate the high frequency across gap g. This concludes an explanation of the broad aspects of the invention practiced by the preferred embodiment; however, the full implementation of the present invention employs ancillary control functions.

SCR firing control 204 illustrated in FIG. 2 is a part of controller C. Selection of low current for the welding process controls the logic on line 206 to deactivate the SCRs when welder 10 operates at low current $I_M$. Control 204 also directs to controller C the adjusted desired weld current $I_w$ on line 264 when welder 10 is operated at a current above the low level current $I_M$. Control 204 further performs ancillary decisions based upon programmed options, schematically illustrated in FIGS. 2A and 2B. Peak current 164 of pulse P is represented by block 250. This value is set at a level, which in practice is 50–70 amperes. When pulse control 100 is activated by a signal on line 104, controller C is biased to the peak current 250 by pulse control 100. Peak current 164 is a signal indicated by the number or value on line 252 which in practice is 50–70 amperes. Thus, stage 22 is forced toward peak current 164 as soon as welding arc is established. The value on line 252 sets controller C for this initial application of current to gap g. This is the pulse peak value 164. The welding current is adjusted by an operator using rheostat or device 260. The position of contact 266 on resistor 262 is the current demand signal $I_w$ appearing in line 264. Device 260 has an adjustable resistor 92a to set low current level. Rheostat 260 provides a signal in line 264 which is above the low current level set by resistor 92a. Contact 266 is shown in the "low current" position. In this position stage 24 gives a fixed weld current and uses the invention.

Figure 5:
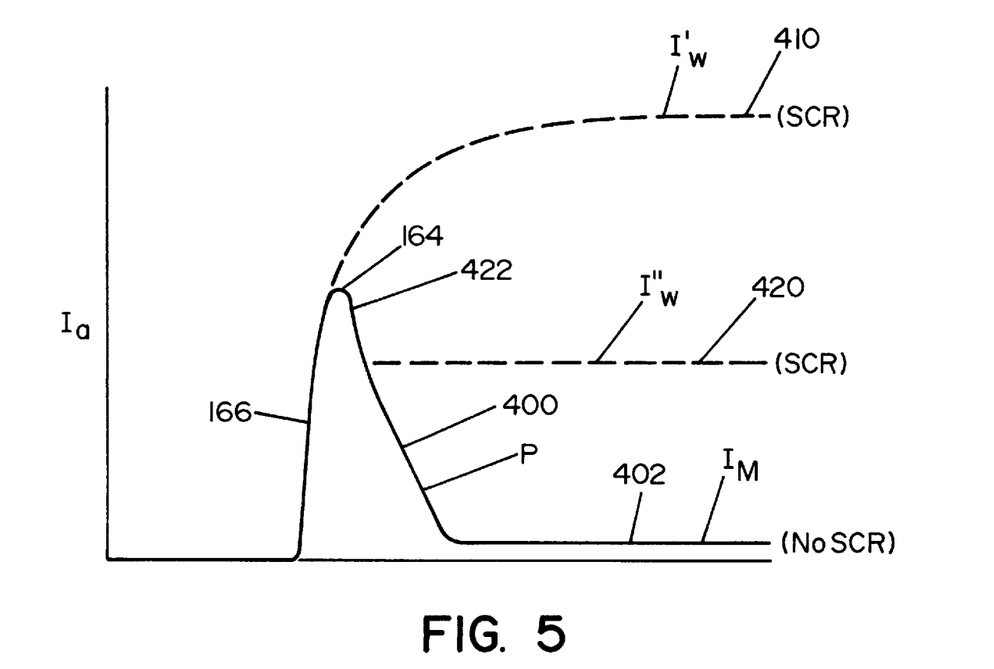
FIG. 5 is a current graph illustrating the current pulse used to start a DC TIG welder set to operate at low current; and, FIG. 6 is a current graph showing the current curve using the invention when set for a low current of 2 amperes and when operated at 2 amperes and 5 amperes.

The pulse peak current level 250 and the weld level on line 264 have a relationship that determines whether the start pulse is applied, and its duration. This function is schematically illustrated in FIG. 2A, where comparator 300 compares the logic on lines 254, 264. If the adjusted desired weld current $I_w$ from device or rheostat 260 is greater than pulse peak current 164, a logic 1 appears in line 302. There is no need for a pulse. The high frequency starts the arc. Thus, controller C is controlled by $I_w$ from desired current set by device or rheostat 260. A logic 1 appears in line 302. When the firing circuit control 204 is activated with a START signal by closing switch 200, a logic 1 appears in line 304 and in line 330. This immediately enables the function represented by step or block 336. This step shifts the logic on line 362 to cause operation by the level on line 264. Controller C switches to control by desired current $I_w$ at once. No pulse is needed. A logic zero on line 302 is the condition when the adjusted weld level or desired current $I_w$ of the block 260 representing rheostat or device 260, is less than the pulse peak (50–70 amperes) represented by block 250. A START signal 200 causes the logic zero in line 304. Thus, line 330 is a logic zero. Logic zero on line 304 is inverted by inverter 310 to produce a logic 1 at line 312. A time delay 320 waits a set time before converting output 322 to logic 1 for enabling function block 336. Thus, if the weld level $I_w$ is greater than the pulse peak, there is an immediate shift of controller C to operate in accordance with the desired current $I_w$. There is no pulse. However, if the required current $I_w$ from device or rheostat 260 is less than the pulse peak, control 204 shifts to operation of controller C by desired current $I_w$, but only after a time set by delay device 320 to accommodate the start pulse. This allows for the arc start sequence of the invention at any current below the set peak current of pulse P. The concept schematically represented in FIG. 2A is shown in FIG. 5. When operating at low current $I_M$ set by resistor 92, the initial current flows along edge 166 to the biased current 164 of controller C. Pulse control 100 then causes the creation of pulse P by phasing back the SCRs of stage 22 so arc current $I_a$ decays along line 400 to the low welding current represented by line 402. If the logic on line 362 immediately shifts to a logic one, the selected or desired current $I_w$ is greater than the peak current 250. This is illustrated by curve $I'_w$ where the current $I_w$ is set at a high level 410. The initial current flow is along edge 166; however, there is no pulse P at this high current. Thus, curve $I'_w$ merely advances to the set high current 410 without the starting sequence. Pulse P will be formed if the desired current $I_w$ is less than the peak current of pulse P. This condition is illustrated by line curve I"$_w$ where current I$_w$ is set at level 420. The SCRs of stage 22 are employed during the welding operation. But, pulse P is still formed after which curve I"$_w$ decays for only a short distance illustrated as curve 422. FIG. 5 illustrates a concept of the invention. This feature is implemented in software and/or by normal electrical components that are merely represented by the general logic diagram and flow chart of FIG. 2A.

FIG. 2A, combined with FIG. 2, shows the operation of SCR firing control 204. This control determines when controller C is operated by the desired current I$_w$ in line 264. When that happens, the SCRs provide greater current than available from fixed, settable minimum current stage 24. However, if and when the output I$_M$ of stage 24 as read on input line 90 is greater than the weld level I$_w$ of device or rheostat 260, the SCRs are inhibited. This control function is illustrated in the flow chart and wiring diagram of FIG. 2B. When START switch 200 activates, a logic 1 in line 202 close electronic switch 360. Voltage source V$_{cc}$ applies a logic 1 through resistor 370 and line 356 to line 206. A logic 1 in line 206 activates SCR trigger circuit 106 at the onset of START switch 200. The logic in line 206 then remains high (logic 1) or being pulled low (logic 0) depending on the logic in line 354. When the operator desired current in line 264 is greater than the fixed, settable minimum current I$_M$ in line 90, comparator 350 generates a logic 1 in line 352 which in turn causes a logic 1 in line 354 after a delay time set by pulse time 320. A logic 1 in line 354 does not affect the logic 1 in line 206, line 206 remains at logic 1. However, when the operator desired current in line 264 is less than the settable minimum current I$_M$, comparator 350 generates a logic 0 in line 352; after a delay time set by pulse time 320 a logic 0 propagates to line 354 from line 352. A logic 0 in line 354 pulls logic in line 206 low to logic 0 and deactivates SCR trigger circuit 106. Thus, if controller C is not shifted to control by I$_w$ or if current I$_M$ is greater than selected current I$_w$, the SCRs do not operate except by starting sequence by control 100. The process as shown in FIGS. 2A and 2B supplements the disclosure in FIG. 2. These figures illustrate a preferred implementation of the present invention and are not necessary to perform the invention as illustrated in FIGS. 3 and 4. In practice, when low current is selected, the SCRs are deactivated by a control system represented by a zero in line 206.

Figure 6:
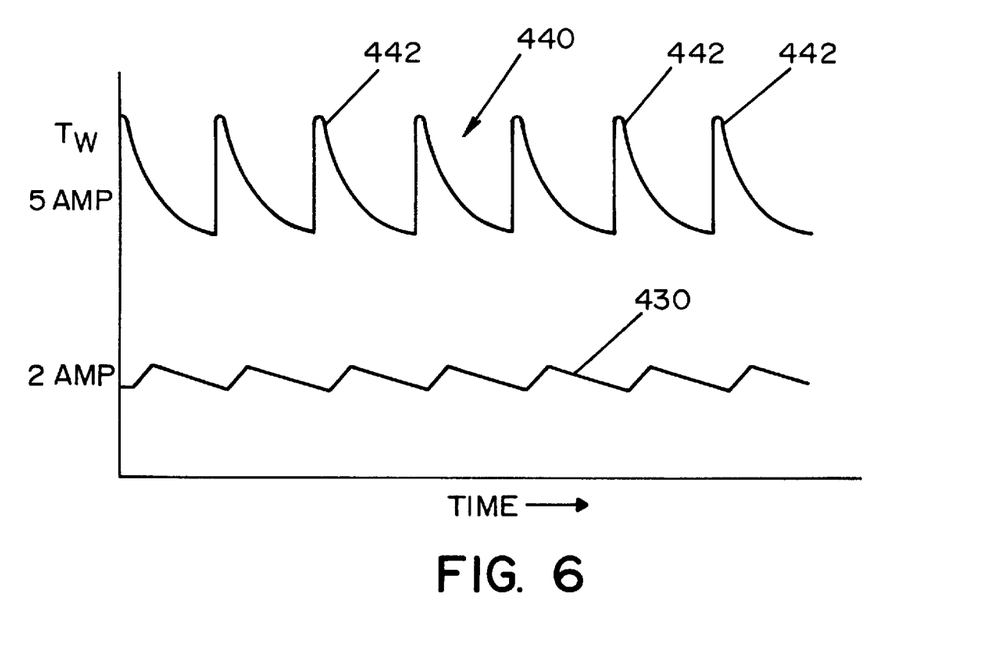

The operation of welder 10 when using the present invention is illustrated in FIG. 6. The low current operation is selected by device 260. In this instance, resistor 92 has set the current of stage 24 to 2 amperes. Thus, the 2 ampere weld current curve 430 has the general appearance of an inverter. There are no SCR spikes. In the prior art, welder 10 sets to operate at 2 amperes would have a current curve with a series of short SCR spikes. At low current the arc would be difficult to stabilize. The invention uses no SCR spikes at 2 amperes. If welder 10 with resistor 92 set at 2 amperes is adjusted by rheostat 260 to obtain 5 amperes, curve 440 is the weld current. This curve has SCR spikes 442 and is not as stable as possible. When using the invention, if the low current is to be 5 amperes, resistor 92 is merely adjusted for 5 amperes. Curve 440 then takes on the shape of curve 430. If welder 10 is then adjusted to a higher current, such as 8 amperes, the SCR spikes are again experienced. FIG. 6, taken together with FIGS. 3, 4 and 5, show the operation of the invention and the particular control concepts and components can be easily selected by persons with ordinary skill in power supplies for DC TIG welders.

Having thus defined the invention, the following is claimed:

1. A DC TIG welder operable at a set low current level under about 5 amperes in a welding circuit including an electrode separated from a workpiece by a gap, said welder having an output welding current adjustable above said low current and driven by a constant current power supply with a first rectifier having an output current controlled by the firing phase of SCRs in an SCR network, a second rectifier settable at said low current and a sensor for sensing arc voltage, said welder further comprising: a circuit to deactivate said SCRs when said output welding current is equal to or less than said set low current and an arc starting device including a high frequency generator connected in said welding circuit to pass a high frequency, high voltage current across said gap; a circuit for activating said high frequency generator upon starting of said welder and after said arc voltage is sensed to be greater than a first given value; a start pulse device activated simultaneously with the arc start by high frequency from said high frequency generator to cause said first rectifier to output a high current pulse by operation of said SCRs of said network; and, a termination circuit for deactivating said high frequency generator after said arc voltage is generally less than a second given value.

2. A welder as defined in claim 1 wherein said first and second given values are generally the same.

3. A welder as defined in claim 2 wherein said given value(s) are about 35 volts DC.

4. A welder as defined in claim 1 wherein said given value(s) are about 35 volts DC.

5. A welder as defined in claim 1 wherein said first given value is about 35 volts DC.

6. A welder as defined in claim 1 wherein said termination circuit includes a circuit for delaying said deactivation for a given time after said arc voltage is sensed to be less than said second value.

7. A welder as defined in claim 6 wherein said first given value is about 35 volts DC.

8. A welder as defined in claim 6 wherein said first and second given values are generally the same.

9. A welder as defined in claim 8 wherein said given values are about 35 volts DC.

10. A welder as defined in claim 6 wherein said peak current of said pulse is greater than about 50 amperes.

11. A welder as defined in claim 10 wherein said high current pulse has a duration of about 30–50 ms.

12. A welder as defined in claim 10 including a circuit for deactivating the SCR network of said first rectifier when said settable current of said second rectifier is greater than or equal to the adjusted output current for said welder.

13. A welder as defined in claim 12 wherein said high current pulse has a duration of about 30–50 ms.

14. A welder as defined in claim 6 wherein said high current pulse has a duration of about 30–50 ms.

15. A welder as defined in claim 6 including a circuit for deactivating the SCR network of said first rectifier when said settable current of said second rectifier is greater than or equal to the adjusted output current for said welder.

16. A welder as defined in claim 6 wherein said first rectifier has a single phase input.

17. A welder as defined in claim 1 wherein said peak current of said pulse is greater than about 50 amperes.

18. A welder as defined in claim 17 including a circuit to prevent said start pulse when said adjustable output welding current is greater than the peak current of said pulse.

19. A welder as defined in claim 18 wherein said high current pulse has a duration of about 30–50 ms.

20. A welder as defined in claim 17 wherein said first rectifier has a single phase input.

21. A welder as defined in claim 1 including a circuit to prevent said start pulse when said adjustable output welding current is greater than the peak current of said pulse.

22. A welder as defined in claim 1 wherein said high current pulse has a duration of about 30–50 ms.

23. A welder as defined in claim 22 including a circuit for deactivating the SCR network of said first rectifier when said settable current of said second rectifier is greater than or equal to the adjusted output current for said welder.

24. A welder as defined in claim 22 wherein said first rectifier has a single phase input.

25. A welder as defined in claim 1 including a circuit for deactivating the SCR network of said first rectifier when said settable current of said second rectifier is greater than or equal to the adjusted output current for said welder.

26. A welder as defined in claim 25 wherein said first and second rectifiers each have a single phase input.

27. A welder as defined in claim 1 wherein said first rectifier has a single phase input.

28. A welder as defined in claim 1 including a circuit to adjust said low current level.

29. A welder as defined in claim 28 wherein said adjustment is in the range of 1–5 amperes.

30. A welder as defined in claim 29 including a potentiometer to adjust said output welding current to a level above said low current level and a circuit to activate said SCR network when said adjusted output weld current is greater than said low current level.

31. A welder as defined in claim 28 including a potentiometer to adjust said output weld current to a level above said low current level and a circuit to activate said SCR network when said adjusted output weld current is greater than said low current level.

32. A welder as defined in claim 1 including a potentiometer to adjust said output weld current to a level above said low current level and a circuit to activate said SCR network when said adjusted output weld current is greater than said low current level.

33. A welder as defined in claim 1 wherein a logic circuit for activating said high frequency generator when said arc voltage is sensed to be greater than said first given value.

34. A method for DC TIG welding by a low current level under about 5 amperes in a power circuit including an electrode separated from a workpiece by a gap, said welder having an adjustable output welding current adjustable above said low current and driven by a constant current power supply with a first rectifier having an output current controlled by the firing phase of SCRs in an SCR network and a second rectifier settable at said low current and a sensor for sensing arc voltage, said method comprising:
  (a) deactivating said SCRs when said output current is adjusted to a value equal to or less than said low current;
  (b) passing a high frequency high voltage current across said gap;
  (c) activating said high frequency current upon starting of said welder and after said arc voltage is sensed to be greater than a first given value;
  (d) causing said first rectifier to output a high current pulse by operation of said SCRs of said network; and,
  (e) deactivating said high frequency current after said arc voltage is generally less than a second given value.

35. A method as defined in claim 34 wherein said termination act includes delaying said deactivation for a given time after said arc voltage is sensed to be less than said second value.

36. A method as defined in claim 34 wherein said high current of said pulse is greater than about 50 amperes.

37. A method as defined in claim 36 including deactivating the SCR network of said first rectifier when said settable low current of said second rectifier is greater than or equal to the adjusted output current for said welder.

38. A method as defined in claim 34 wherein said high current pulse has a duration of at least about 30–50 ms.

39. A method as defined in claim 34 including adjusting said low current level.

40. A method as defined in claim 39 including adjusting said output weld current to a level above said low current level and activating said network when said output weld current is greater than said low current level.

41. A method as defined in claim 34 including adjusting said output weld current to a level above said low current level and activating said network when said output weld current is greater than said low current level.

42. A DC TIG welder operable at a set low current level under about 5 amperes in a welding circuit including an electrode separated from a workpiece by a gap, said welder having an output welding current adjustable above said low current and driven by a constant current power supply with a first rectifier having an output current controlled by the firing phase of SCRs in an SCR network, a second rectifier settable at said low current and a sensor for sensing arc voltage, said welder further comprising: a circuit to deactivate said SCRs when said output welding current is equal to or less than said set low current and an arc starting device to output a high current pulse by operation of said SCRs of said network; and, a termination circuit for deactivating said SCRs during welding at said low current.

43. A welder as defined in claim 42 wherein said peak current of said pulse is greater than about 50 amperes.

44. A welder as defined in claim 42 wherein said high current pulse has a duration of about 30–50 ms.

45. A welder as defined in claim 42 including a circuit to prevent said start pulse when said adjustable output welding current is greater than the peak current of said pulse.

46. A welder as defined in claim 42 including a circuit for deactivating the SCR network of said first rectifier when said settable current of said second rectifier is greater than or equal to the adjusted output current for said welder.

47. A DC TIG welder operable at a set low current level under about 5 amperes in a welding circuit including an electrode separated from a workpiece by a gap, said welder having an output welding current adjustable above said low current and driven by a constant current power supply with a first rectifier having an output current controlled by the firing phase of SCRs in an SCR network, a DC power supply settable at said low current and a sensor for sensing arc voltage, said welder further comprising: a circuit to deactivate said SCRs when said output welding current is equal to or less than said set low current and an arc starting device to output a high current pulse by operation of said SCRs of said network; and, a termination circuit for deactivating said SCRs during welding at said low current.

48. A welder as defined in claim 47 wherein said peak current of said pulse is greater than about 50 amperes.

49. A welder as defined in claim 47 wherein said high current pulse has a duration of about 30–50 ms.

50. A welder as defined in claim 47 including a circuit to prevent said start pulse when said adjustable output welding current is greater than the peak current of said pulse.

51. A welder as defined in claim 47 including a circuit for deactivating the SCR network of said first rectifier when said settable current of said second rectifier is greater than or equal to the adjusted output current for said welder.

* * * * *